May 27, 1969     L. E. COLOSIMO     3,446,509
CHUCK JAW
Filed June 1, 1966
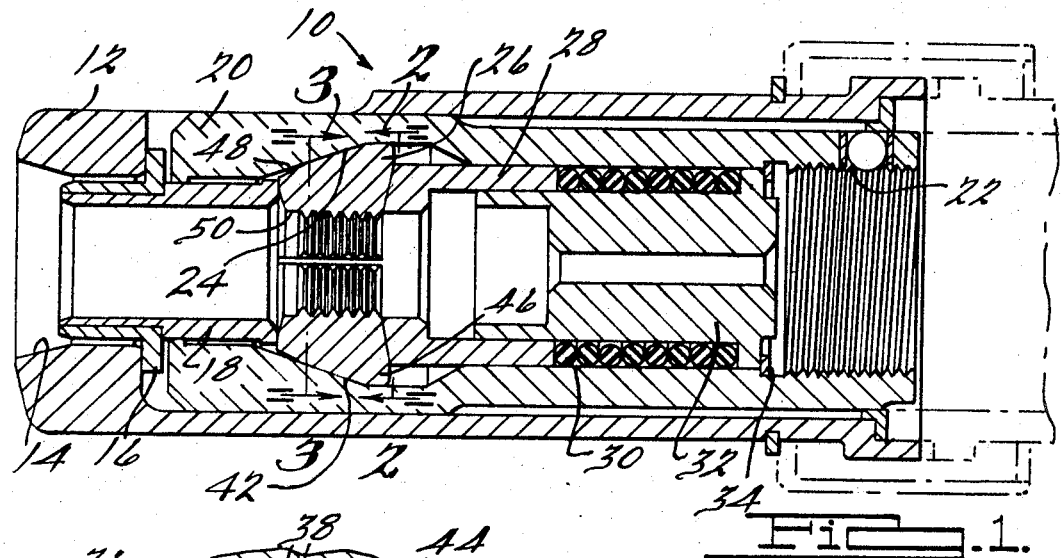
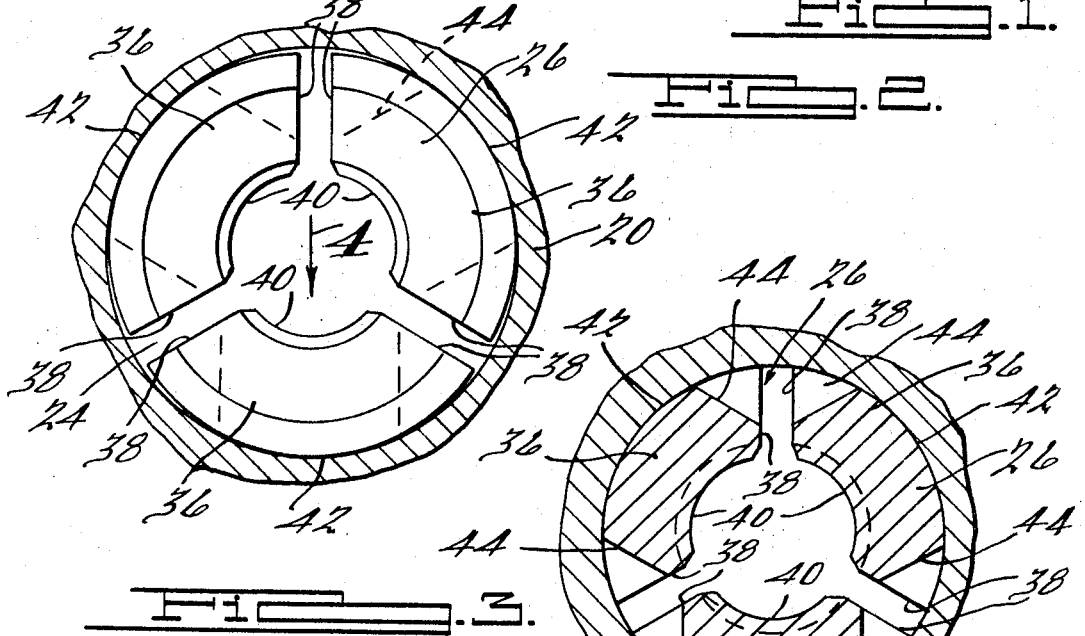
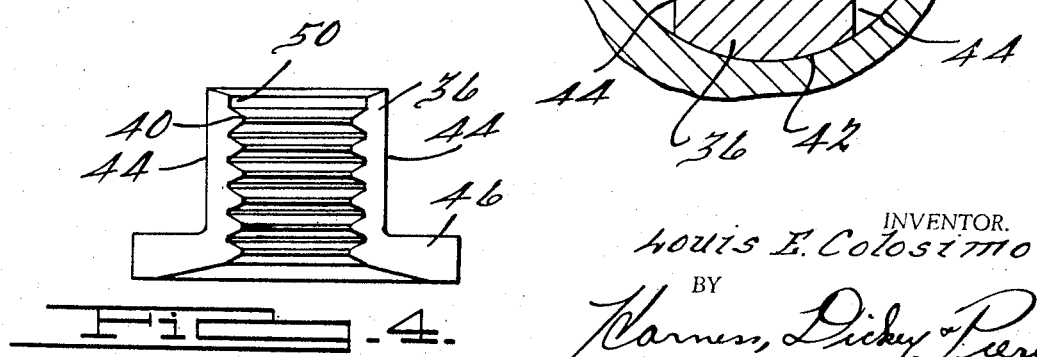
INVENTOR.
Louis E. Colosimo
BY
Harness, Dickey & Pierce
ATTORNEYS.

United States Patent Office 3,446,509
Patented May 27, 1969

3,446,509
CHUCK JAW
Louis E. Colosimo, St. Clair Shores, Mich., assignor to Huck Manufacturing Company, Detroit, Mich., a corporation of Michigan
Filed June 1, 1966, Ser. No. 554,534
Int. Cl. B23b 31/10, 5/22; B25g 3/22
U.S. Cl. 279—7                                                                  8 Claims

ABSTRACT OF THE DISCLOSURE

A chuck jaw assembly for a tool for setting fasteners and having a plurality of jaw segments which segments are relieved at their circumferential extremities.

---

The present invention relates to a chuck jaw construction, and more particularly to a chuck jaw construction for use with a tool for setting fasteners.

Chuck jaw assemblies of the type shown in the present application, but of the conventional construction, are shown with the tools depicted in United States patent to G. J. Van Hecke 3,115,752 and G. J. Van Hecke et al. 3,107,806. These tools are used to set two piece fasteners known in the art as lock bolts and which comprise a pin and a collar; the chuck jaw construction, however, can be used to set a variety of fasteners utilizing a pin member. In general, the chuck jaw assembly is provided to cooperate with a collet member which has a frusto-conically shaped bore which receives the assembly. The chuck jaw assembly has a similarly shaped frusto-conically shaped external surface and is made of a plurality of jaw segments which function together and which are adapted to be moved axially and radially within the frusto-conical bore in the collet in accordance with the engagement of the external surfaces of the segments with the bore in the collet. It can be appreciated that since both the surface of the bore in the collet and the outer surface of the chuck jaw assembly generally define a cone, there will be only one axial position of the chuck jaws within the bore at which the cones are exactly of mating contour. If the chuck jaws are moved farther axially into the bore beyond this one position only the circumferentially outer edges of the segments will engage the wall of the bore. On the other hand, if the chuck jaw members are moved axially outwardly farther, then the jaw segments will engage the wall of the bore in the collet member generally along the circumferential centers of the jaw segments. If the jaw assembly is loaded in either of the above conditions, high stresses in localized areas will result. In the present invention an improved structural construction is provided resulting in minimization of these high localized stresses; therefore, it is a general object of the present invention to provide an improved chuck jaw construction.

It is another object of the present invention to provide an improved chuck jaw construction for use with tools for setting fasteners including a pin member to be gripped by the chuck jaws.

It is still another object of the present invention to provide an improved chuck jaw construction in which localized stresses as a result of nonmating of the contours between chuck jaw members and the collet is substantially relieved.

Other objects, featuers, and advantages of the present invention will become apparent from the subsequent description and the appended claims, taken in conjunction with the accompanying drawings, in which:

FIGURE 1 is a longitudinal sectional view of a nose assembly including the chuck jaw assembly of the present invention, which nose assembly is a portion of a tool for setting fasteners of the lock bolt type including a pin and a collar;

FIGURE 2 is a view of the nose assembly of FIGURE 1 taken generally along the line 2—2 in FIGURE 1;

FIGURE 3 is a sectional view of the assembly of FIGURE 1, taken generally along the line 3—3 in FIGURE 1; and FIGURE 4 depicts one of the segments of the chuck jaw assembly as viewed in the direction of the arrow indicated by the numeral 4 in FIGURE 2.

Looking now to the drawing, a nose assembly for setting fasteners is generally indicated by the numeral 10 and includes an anvil member 12 having a bore 14 at its forward end for swaging a collar onto the pin of a fastener. A tubular ejector member 16 is movable partially within the bore 14 and is adapted to eject the anvil 14 from the swaged collar of the fastener. A chuck jaw release member 18 is supported in the ejector 16 which serves a purpose to be presently seen. The anvil member 12 is stationary and is generally of a tubular construction and has supported therein a collet member 20 which is provided with threaded bore 22 at its rearward end for engagement with the rod of a pull piston (not shown) whereby the collet 20 can be axially reciprocated within the anvil member 12. The collet is provided with a through bore a portion 24 of which is frusto-conically shaped and adapted to receive a chuck jaw assembly 26. A chuck jaw follower 28 is located in the bore in the collet 20 and is adapted to engage a rearward surface of the chuck jaw assembly 26 and serves a purpose presently to be described. The follower 28 is normally maintained axially outwardly by means of a compression assembly 30 which has one end in engagement with the rearward end of hte follower 28 and has its opposite end in engagement with a flange of a tubular sleeve member 32 which is located in the bore of the collet member 20 and has a portion extending generally axially within the follower 28. The compression assembly 30 comprises a plurality of closely packed O-rings which serve to absorb shock loads. The sleeve member 32 is held from axial rearward movement by a snap ring 34.

In operation the nose assembly 10 as shown in FIGURE 1 is in its opened or deactuated position in which the chuck jaw assembly 26 is opened. In this condition, the pin of the fastener can be inserted through the bore 14 and through the opening defined by the assembly 26. Upon actuation of the piston (not shown), the collet member 20 is moved rearwardly. As this occurs, the chuck jaw assembly 26 remains axially fixed by virtue of engagement with the follower 28 and the compression assembly 30. Thus as the collet 20 and its frusto-conical bore portion 24 move rearwardly, chuck jaw assembly 26 moves radially inwardly to its closed position to thereby grip the pin of the fastener. When the pin of the fastener is gripped securely by the chuck jaw assembly 26, the collet 20 then moves the chuck jaw assembly 26 as well as the pin rearwardly relative to the anvil 12 thereby moving the swaging bore 14 of the anvil 12 over the collar to swage it to the pin. Upon completion of the swaging operation, the piston (not shown) is caused to move in a forward direction thereby returning the nose assembly 10 to the position as shown in FIGURE 1.

The chuck jaw assembly 26 is defined by three chuck jaw segments 36 which are of identical construction, each being provided with side surfaces 38. With the chuck jaw assembly 26 gripping a pin and located in its forward or closed position in the frusto-conical bore portion 24 the side surfaces 38 are slightly spaced from each other. In this position the chuck jaw assembly 26 will, by means of the inner surfaces 40, define a generally circular aperture. Each chuck jaw segment 28 is provided with a plurality of teeth on the inner surface 40 to provide means for gripping the pin of the fastener. With the segments 28 engaging a pin, the inner surfaces, together, extend for substantially 360°. The outer surface 42 of each of segments 36 generally defines a frusto-conically shaped portion; however, this outer surface 42 is provided with relieved corner portions 44 and, hence, extends circumferentially for substantially less than 120°; and the surfaces 42 together will extend for substantially less than 360°. The relieved portions 44 of surface 42 extend axially rearwardly for generally the entire extent of the frusto-conical portion of the segment 36 and terminates at a generally straight cylindrical annular flange portion 46. When the pin of the fastener is of the exact proper diameter and is gripped by the segments 36, the segments 36 are axially located in bore portion 24 at a position in which the outer surfaces 42 of segments 36 fully mate with the contour of the bore portion 24. However, for a pin of slightly smaller diameter the segments 36 are moved forwardly and the outer surfaces 42 tend to engage the frusto-conical bore portion 24 at their circumferentially outer ends and loads are exerted on the edges by the surface of bore portion 24. When the pin of the fastener is slightly larger in diameter the segments 36 are moved rearwardly and generally only the center portion of the outer surfaces 42 engages the frusto-conical portion 24; now the pin exerts the loads on the circumferentially outer ends which are unsupported by the surface of the bore portion 24. With past constructions, there were no relieved portions 44 and the outer surfaces 42 extended for generally 120°. In this latter case when the circumferential edges alone would engage the surface of the bore 24 (with a small pin) or be unsupported by the bore 24 (with a large pin) high, concentrated, stresses resulted. With the present construction, as shown with relieved portions 44, the stresses at the edges are minimized and better distribution of the load is provided over the external surface 42. The forward portion 50 of the outer surface 42 is slightly relieved as at 48 so as not to engage with the frusto-conical bore portion 24, hence, removing stress from the thinner sectioned front portions of the segments 42. Thus, the heavy loads will then be taken by the heavier sectioned portions of the segments again relieving high stresses. Further to the relief of the high stresses at the front end portions 50 of the segments 36, the teeth on the inner surfaces 40 terminate at the front end portion 50 or approximately at a point in radial alignment with the rearward extremity of the relieved end portion 50.

With the construction as shown, the chuck jaw assembly can accommodate pins of smaller or greater diameter than the ideal diameter without undue stress concentrations; the results are chuck jaws having a larger working life.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

What is claimed is:
1. In apparatus for gripping the pin of a fastener and having a collet with a frusto-conical bore portion the improvement comprising: a chuck jaw assembly, said assembly having a plurality of jaw segments located at least partially within the bore portion and adapted to be moved axially within the bore portion, said jaw segments having radially inner surfaces defining an opening through said assembly, said jaw segments having radially outer surfaces defining a frusto-conical contour matable with the bore portion, said outer surfaces being relieved at their circumferentially spaced extremities whereby said outer surfaces generally engage the surface of the bore portion except at said extremities which do not contact the bore portion, the axially forward portion of said outer surface being relieved whereby said forward portions do not contact the bore portion.

2. The combination of claim 1 with said inner surfaces having teeth therein for engaging the pin of a fastener with said teeth extending to a point removed a preselected distance from the front of said segments.

3. The combination of claim 1 with said segments having chamfered portions at their forward surfaces and with said inner surface having teeth therein for engaging the pin of a fastener with said teeth extending to a point removed a preselected distance from the end of said chamfered portions.

4. The combination of claim 1 with said inner surfaces having teeth therein for engaging the pin of a fastener with said teeth generally terminating at a point axially in alignment with the rearward extremity of said relief of said axially forward portions.

5. The combination of claim 4 with said segments terminating at their rearward ends in generally straight flange portions and with said flange portions defining a generally continuous annular surface when said segments are proximate in engagement with each other.

6. The combination of claim 5 with the relief at said circumferential extremities extending for a substantial extent of the circumference of said segments and a substantial radial extent.

7. The combination of claim 1 with said outer surfaces at a selected diameter matching the contour of a part of the bore portion and being relieved to define a total surface contact area at said selected diameter of substantially less than 360°.

8. The combination of claim 7 in which there are three said jaw segments with said outer surface of each defining a total surface contact area of said selected diameter of substantially less than 120°.

References Cited

UNITED STATES PATENTS

| | | | |
|---|---|---|---|
| 2,591,287 | 4/1952 | Pellar | 279—58 |
| 2,822,177 | 2/1958 | Tripp | 279—58 |
| 3,002,644 | 10/1961 | Meyer | 279—57 X |

ROBERT C. RIORDAN, *Primary Examiner.*

J. C. PETERS, *Assistant Examiner.*

U.S. Cl. X.R.

72—391; 279—57